(No Model.) 3 Sheets—Sheet 1.
G. W. GRADER.
APPARATUS FOR PURIFYING MILK OR CREAM.
No. 498,645. Patented May 30, 1893.
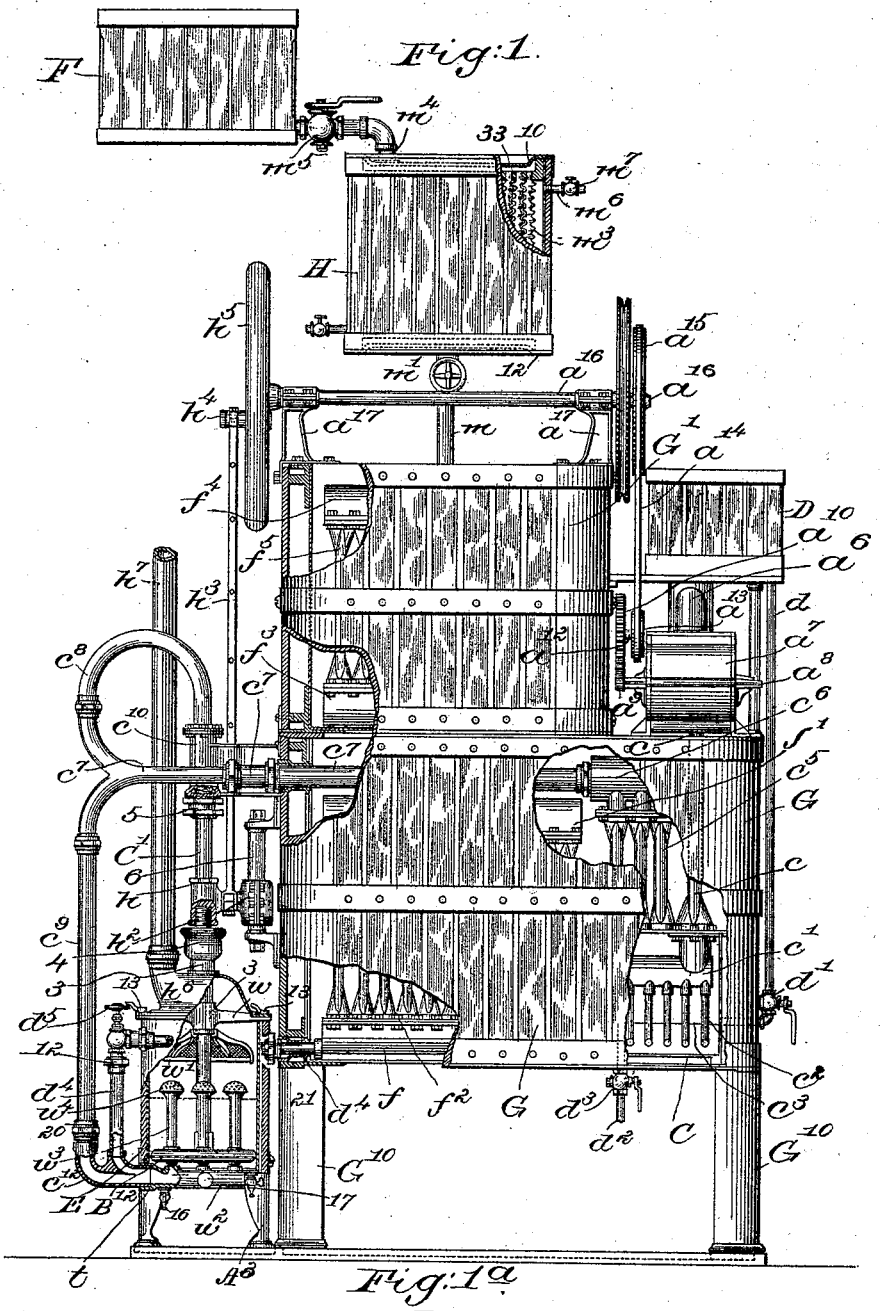
Witnesses.
Fred S. Greenleaf.
Edward F. Allen.
Inventor:
George W. Grader
by Crosby Gregory
Attys.

(No Model.) 3 Sheets—Sheet 2.
G. W. GRADER.
APPARATUS FOR PURIFYING MILK OR CREAM.
No. 498,645. Patented May 30, 1893.
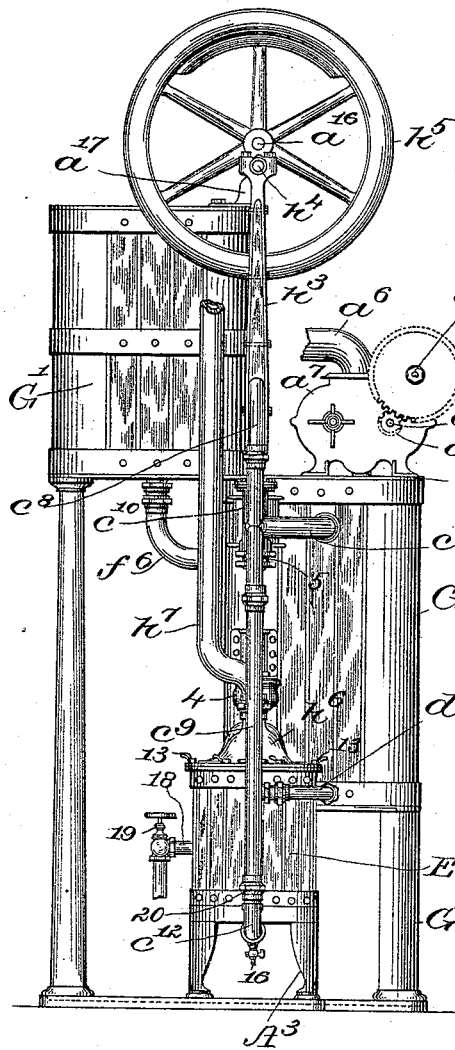
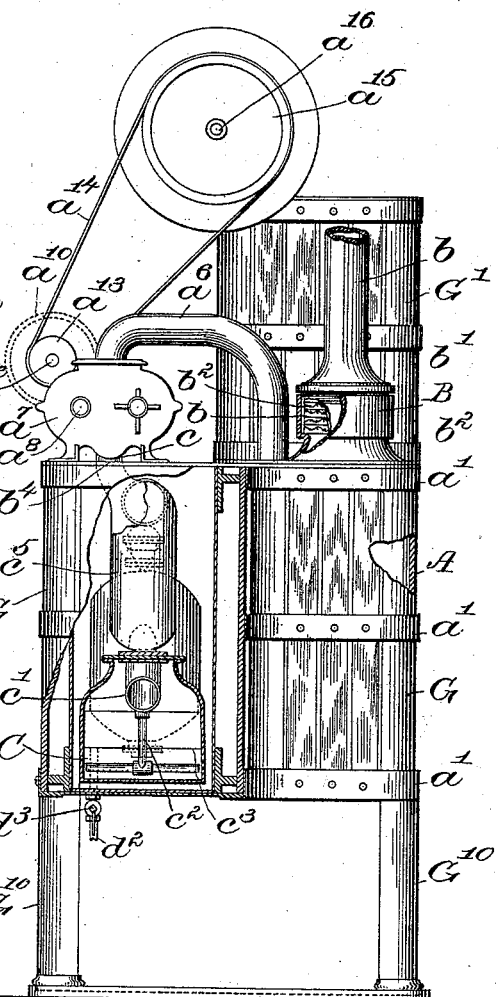
Witnesses:
Fred S. Greenleaf
Edward F. Allen
Inventor:
George W. Grader,
by Crosby & Gregory
Attys.

(No Model.) 3 Sheets—Sheet 3.
G. W. GRADER.
APPARATUS FOR PURIFYING MILK OR CREAM.
No. 498,645. Patented May 30, 1893.
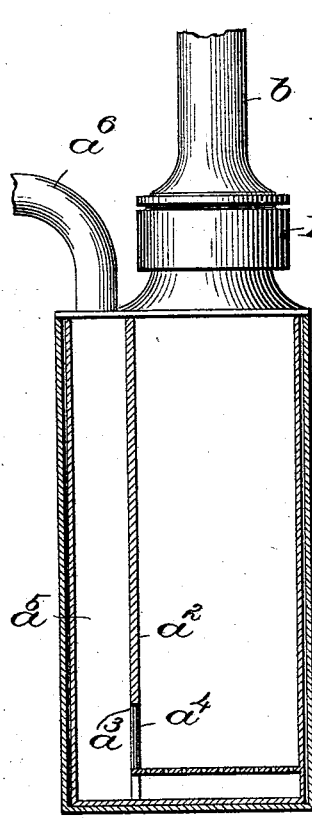
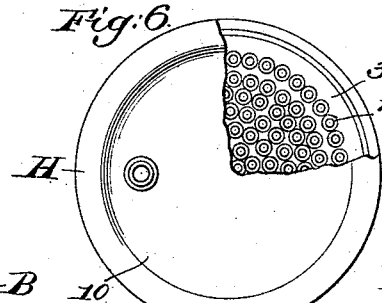
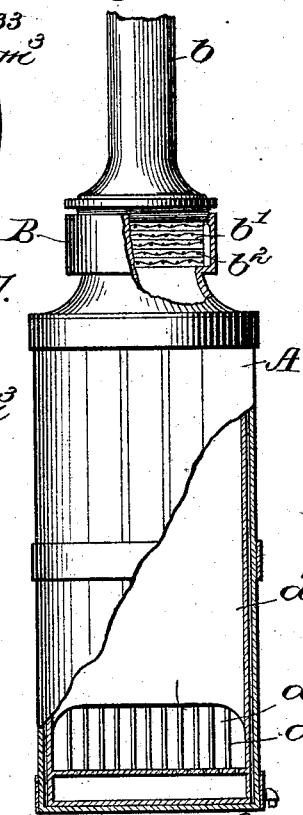
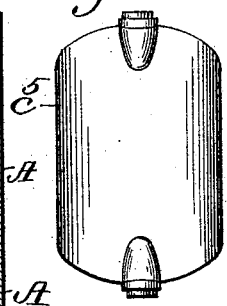
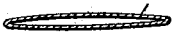
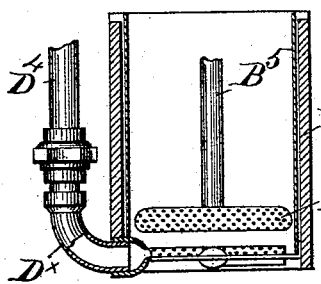
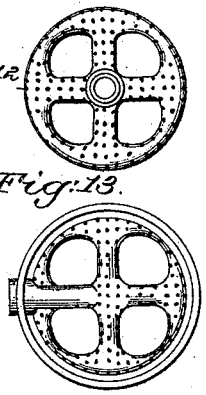
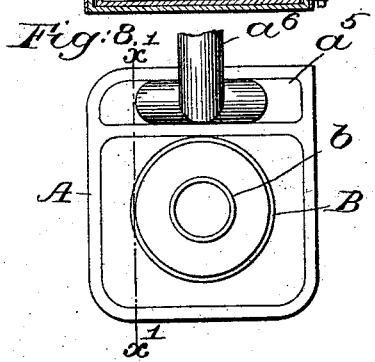
Witnesses.
Edward F. Allen
Frederick L. Emery
Inventor:
George W. Grader
by Crosby & Gregory
attys.

UNITED STATES PATENT OFFICE.

GEORGE W. GRADER, OF MARBLEHEAD, MASSACHUSETTS.

APPARATUS FOR PURIFYING MILK OR CREAM.

SPECIFICATION forming part of Letters Patent No. 498,645, dated May 30, 1893.

Application filed December 28, 1891. Serial No. 416,299. (No model.)

*To all whom it may concern:*

Be it known that I, GEORGE W. GRADER, of Marblehead, county of Essex, State of Massachusetts, have invented an Improvement in Apparatus for Purifying Milk or Cream, of which the following description, in connection with the accompanying drawings, is a specification, like letters and figures on the drawings representing like parts.

Very considerable study has been given of late years as to the condition of the milk supply for cities and towns with the view to insure purity thereof, and prevent the use of milk containing various impurities detrimental to health. In my investigations in this direction I have discovered a novel method by which milk and cream may be treated to effect its complete purification, and have devised a novel apparatus for the purpose, which apparatus I shall hereinafter describe.

In accordance with my invention I subject the milk or cream in a suitable purifying cylinder to a current or blast of air which has been washed. This air may be washed in water, or in water containing in solution an alkali or other suitable material capable of deodorizing and disinfecting the milk or cream through which the air is forced, the chemical material used in the water and in the solution being, however, such as will not render the milk or cream deleterious to the health of the person using the same. The air preparatory to being washed will, for the best results, be made to pass through an ice tank in contact with ice therein, the said ice taking out of the air any floating particles. By the contact of the air with the ice, preferably crushed ice, in the ice tank, the air is cooled, and as the ice is gradually melted a fresh clean surface of ice is constantly being exposed to be acted upon by the incoming air. The water from the melting ice will be carried away together with its impurities to some point outside the machine.

In the treatment of milk or cream to purify and deodorize the same, while I prefer, for the best results, to force into the milk or cream in the purifying cylinder, air, saturated or impregnated as described, yet I may obtain excellent results and novel effects by treating the milk or cream directly by air which has been washed and freed from its impurities. To more effectually purify the air, it is preferred to, and I have provided means, a filter, through which the air is taken preparatory to entering the ice tank, the said filter consisting of suitable layers of lint cotton supported by reticulated material, such as wire gauze. This filter takes out the great majority of floating particles from the air before it enters the ice tank and comes in contact with the ice therein.

Having referred to my invention in so far as it relates to the introduction of air into the milk or cream, I will now refer to the method of introducing the milk or cream into the purifying cylinder. If the milk or cream is to be treated in its natural state, then the same will be taken from a milk tank and led into and through refrigerating or cooling tanks into the said purifying cylinder; but if the milk or cream is to be sterilized, then, instead of taking it directly from the milk tank into the refrigerating or cooling tanks, it will first be led through a boiler or heater, adapted to be heated by steam, so that the milk may be boiled at any desired temperature, it being necessary, in order to thoroughly free the milk or cream from any germs which may be contained in it, to heat the same to a temperature higher than that obtainable by simply boiling the milk, as in ordinary methods, by the direct application of sensible heat to the vessel containing the milk. By treating sterilized milk in the manner herein provided for, it is possible to remove from it the taste commonly attending milk boiled in ordinary and usual manner, milk sterilized by my method being equally as palatable as plain milk, and the objectionable taste of boiled milk being not preceptible.

Figure 1 is a front elevation, partially broken out, of a machine or apparatus embodying my invention in one form, it illustrating the method practiced by me in treating milk and cream; Fig. 1ª, a plan view of the bottom-plate $B^{12}$. Fig. 2 is a partial left-hand elevation of the apparatus shown in Fig. 1, the milk tank, the ice tank, and the heater being however omitted. Fig. 3 is a partial right-hand elevation of the apparatus shown in Fig. 1, the filter being broken out; the apparatus being also broken out to show the interior of the wash-box, the supply tank being also omitted. Figs. 4 and 5 are respectively a side elevation and a cross section of one of the pipes or hollow plates forming part of the refrigerating or cooling tank; Fig. 6, a detail showing part of the heater, the same being broken out at the top to represent the milk-receiving pipes. Fig. 7 shows enlarged one of the corrugated pipes through which the milk passes in the heater. Fig. 8 is a top view enlarged of the ice tank for the air. Fig. 9 is a side elevation thereof, partially broken out, and the filter. Fig. 10 is a section of the ice tank in the line $x'$, Fig. 8. Fig. 11 shows a vessel containing parts substantially as represented in my application, Serial No. 416,300, filed December 28, 1891, for the production of butter from cream. Fig. 12 is a plan view of the dasher to be used in connection with the vessel shown in Fig. 11; and Fig. 13 represents the bottom-plate of the vessel shown in Fig. 11.

Referring to the drawings, A represents the ice-tank for cooling and purifying the air. The ice-tank consists preferably of a metal tank, suitably plated or coated with tin or other suitable non-corrosive material, see Figs. 9 and 10, said tank being represented as incased in a jacket of lagging. The ice-tank, see Figs. 9 and 10, has a vertical partition $a^2$, dividing the tank in such manner as to leave a return chamber $a^5$ for the air, cooled and purified by passing through the ice, preferably finely crushed ice, placed in said tank. The lower end of the partition $a^2$ is cut away, as represented at $a^3$, and the space so formed is represented as provided with a grate $a^4$ to prevent ice in the ice-tank A from getting into the return air chamber $a^5$.

Above the ice-tank is a filter B, consisting essentially of an outer shell containing layers $b'$ of lint-cotton, supported by layers $b^2$ of wire-cloth, the casing being represented in Fig. 9, as threaded to receive the threaded foot of an air inlet pipe $b$.

The return air chamber $a^5$ has attached to it or in communication with it a pipe $a^6$, which constitutes the air-supply pipe for the blower $a^7$, which may be of any usual or suitable construction adapted to draw air in and force it out.

The frame-work consists essentially of a base $G^{10}$, on which is erected a metal frame G, having in turn mounted on it a metal frame G'.

The blower, herein represented as of the "Root" variety, has on one of its shafts, as $a^8$, a pinion $a^9$, which is engaged by a toothed gear $a^{10}$, mounted on a suitable shaft $a^{12}$, the said gear or shaft having connected to it a wheel $a^{13}$, driven by a suitable belt or chain $a^{14}$, extended over a suitable pulley $a^{15}$, fast on the main driving shaft $a^{16}$, the said shaft being mounted in suitable bearings or stands $a^{17}$ forming part of the rigid structure of the apparatus. Leading from the blower is a suitable pipe $c$, see Fig. 1, in connection with a header $c'$, to which are connected a series of air-distributing pipes $c^2$, preferably T-shaped, as represented in Fig. 3, and provided at the under sides of their horizontal arms with a series of fine holes.

C is a wash-box containing water or other liquid, the "water line" of which is represented by $c^3$, the lower ends of said air-distributing pipes being immersed in the liquid in the said wash-box. The liquid in the wash-box may be either water, or water containing in solution an alkali, such as lime or some other deodorizing or disinfecting chemical which will not injuriously affect or render the milk deleterious to the health of the person using the same.

D represents a tank containing the liquid, or liquid and chemicals, such as an alkali or a deodorizing substance, which is to supply the liquid for the wash-box. The tank D is connected by a pipe $d$, having a suitable valve $d'$, with the wash-box C, a suitable outlet pipe $d^2$ having a suitable cock $d^3$. The said pipe $d^2$ has its inner end extended up into the wash-box to what is to be the water line, so that by turning the valves $d'$, $d^3$ to the desired points, a proper amount of liquid may be kept in the wash-box and the liquid be renewed therein as required, to keep the same in condition for properly washing and purifying the air. The wash-box is so shaped, see Fig. 3, as to leave above the water line $c^3$ an air chamber, so that the air forced into the wash-box through the pipe $c$ and the distributing pipes $c^2$, after being washed in the liquid in the wash-box, will rise into the said air chamber. This air chamber has connected to it in suitable manner a series of pipes $c^5$, three such pipes being herein shown, said pipes being connected with a header $c^6$, in turn connected with a pipe $c^7$, which is continued by a pipe $c^8$ and a pipe $c^9$, the pipe $c^8$ communicating with an air chamber $c^{10}$, the pipe $c^9$ being in communication with the milk and air amalgamator $c^{12}$. This milk and air amalgamator has two separate inlets and one common outlet. One of the inlets is in communication, as stated, with the air-supply pipe $c^9$, and the other with the milk-supply pipe $d^4$, having a suitable valve $d^5$, which may be turned to regulate the quantity of milk to be admitted into the purifying cylinder E. This purifying cylinder, of non-corrosive material, is herein shown as surrounded by lagging, shown as staves connected together by suitable bands and screws. The upper end of the body of the purifying cylinder is soldered or otherwise secured to the short depending flange of a spider $w$, composed essentially of a ring and a series of arms radiating from a hub 3, the latter acting as a guide for the piston-rod C' to be described, the lower end of the said hub also serving to support what I denominate as the reacting atomizer $w'$, it being composed of a cup-shaped casting having a series of arms covered with wire gauze. The outer or ring part of the spider, near its outer edge, has suitable bolt-holes to receive a series of bolts 13, by which to secure in place the casting $h^6$, which, as shown, constitutes the cover or top for the purifying cylinder, the said cover being of such shape as to act as an air-chamber, said cover having connected with it the impure-air discharge pipe $h^7$. The cover also has a suitable cup-like trap 4 to receive and conduct back into the purifying cylinder any milk or cream brought up by the action of the piston-rod, the trap also acting as a guide for the piston-rod. The bottom $w^2$ of the cylinder is shown as composed of a casting having suitable passages for the reception of milk and air, the said bottom having at its outer edge an upturned flange, to which is secured by soldering or otherwise the lower end of the side walls of the said cylinder. The upper side of the bottom is provided with suitable nipples, extended upwardly for a short distance and threaded for the reception of pipes $w^3$, upon the upper ends of which are secured the milk and air atomizers $w^4$, the holes in the said atomizers being more or less fine and more or less close together, according to the fineness of the streams of milk to be discharged, or according as the milk is to be more or less atomized. The bottom has at one side an inlet opening $t$, shown in Fig. 1, to receive the delivery end of the milk and air amalgamator $c^{12}$. The purifying cylinder rests up a suitable base $A^3$. The bottom referred to has a suitable cock 16 by which to draw therefrom any milk or cream which may be left in the bottom plate, or for drawing therefrom water when cleaning the same. The cock 17 is connected with the pipe extending into the purifying cylinder so as to take away from the said cylinder the milk which may below the milk line in the said cylinder. The pipe 18, see Fig. 2, is extended through the outer lagging of the purifying cylinder E, and is open at about what is to be the milk or cream line in the said cylinder.

In practice the milk to be purified will be permitted to run continuously or substantially so into the milk-purifier, and the purified milk will be permitted to run out from the said purifying cylinder through the outlet pipe 18, having a suitable valve 19.

If it is desired to remove the purifying cylinder, the operator will disconnect the pipe $c^9$ from the milk and air amalgamator by unscrewing the running nut or union 20, and will then unscrew the running nut or union 12 forming part of the milk circulating pipe $d^4$, then by loosening the bolts 13 disconnect the cross-head from the piston-rod, thus leaving the milk purifying cylinder free to be removed, together with the milk and air amalgamator, leaving the spider and attached return atomizer in position, the cover $h^6$ also remaining in position. The milk-supply pipe $d^4$ is continued to and connected with the header $f$ of the secondary cooling or refrigerating tank, through which passes the milk to be treated in the purifying cylinder.

The secondary cooling or refrigerating tank is composed of two like headers $f, f'$, connected by a series of pipes $f^2$. As herein shown, there is located above the secondary cooling or refrigerating tank, a primary cooling or refrigerating tank, composed of headers $f^3, f^4$, connected by suitable pipes $f^5$, the headers $f^3$ of the primary milk-cooling or refrigerating tank being connected with the header $f'$ of the secondary milk-cooling or refrigerating tank, by means of a pipe $f^6$. Preferably these refrigerating tanks will be set one back or above the other and the milk tank above them, as best represented in Fig. 1, so that the milk may descend by gravity from one into and through the other of said tanks, and with a pressure or head corresponding with the pressure or head of the air when the said milk and air are brought in contact in the amalgamator $c^{12}$. These headers and pipes constituting the main portions of the cooling or refrigerating tanks, are contained in the frame parts G, G' referred to.

The pipes $c^5$ and $f^2, f^5$, are of the shape shown in Figs. 4 and 5,—i. e., they are composed of side walls located quite close together so as to contain thin bodies of milk between them, each pipe having a suitable collar or neck to make connection with the headers.

The tubular shanks of the atomizers serve as guides for a movable air-distributing dasher $B^{12}$, having a series of perforations 2 to permit air to be discharged therefrom into the milk or cream. This dasher has screwed into its central hollow hub a hollow piston-rod C', the upper end of which is extended up through the hub 3 of the spider $w$, the trap 4 and the stuffing box 5 of the air chamber $c^{10}$. The piston-rod C' is made in two parts and screwed preferably into a hollow hub-like part $h$ of a cross-head $h^2$ which is guided upon a slide 6, the said cross-head being joined by a connecting-rod $h^3$ to a crank-pin $h^4$, connected to a balance wheel $h^5$, fast on the main shaft $a^{16}$, the said shaft in its rotation reciprocating the said hollow piston-rod and causing the dasher to rise and fall for a short distance in the milk or cream. The reacting atomizer acts to arrest and return the sprayed milk so that the air forced into the purifier will be most thoroughly commingled with the entire body of the milk,—or in other words, as I consider it, the milk is thoroughly washed and purified by the washed and purified air.

The header $c'$ and its distributing pipes $c^2$ are contained in a small supplemental tank set in the tank G.

The tanks G and G', between their inner sides and the outer sides of the cooling or refrigerating pipes and headers, will be packed with some cooling or refrigerating substance, as ice and salt, and the air pipes $c^7$ as well as the air pipes $c$ and $c^5$ will be extended through the ice and salt or other refrigerating substance contained in the tank G, so that the washed air, impregnated or saturated if desired, is also cooled on its passage from the wash-box into the dasher of the milk-purifier, and also into the air and milk atomizers.

Connected with the header $f^4$ of the primary refrigerating or cooling apparatus is a pipe $m$, having a suitable valve $m'$, the said pipe being in communication with a boiler or heater H, which is composed of a metallic shell provided with a suitable outer jacket, the said shell being made like a boiler and having suitable heads 10, 12, each head having a short distance inside of it a suitable tube-sheet, as 33, into which is entered and expanded or otherwise connected in usual manner suitable pipes $m^3$, preferably corrugated to thereby enable the body of milk in the pipes to be reduced, while outside the pipes present greater heating surface. The pipe $m$ passes through one of the heads of the shell and enters the space between the inner side of the head and the tube-sheet next to it. The head 10 receives through it a pipe $m^4$, having a suitable valve $m^5$ in communication with the milk tank F.

I have shown the shell composing the boiler or heater as provided with a pipe $m^6$, which, in case the milk is to be boiled by steam, may be put in communication with some suitable source of steam supply, the said pipe having a suitable valve $m^7$ by which to control the admission of steam into the said shell, the steam encircling the outside of the pipes $m^3$ and boiling the milk, which passes through the said pipes on its way into the pipe $m$. In case it is not desired to boil the milk, then the steam will be entirely cut off and the milk or cream may pass in its natural state through the pipes $m^3$ and into the pipe $m$.

Assuming that the milk or cream to be purified is not to be sterilized, the operation may be carried on as follows:—The milk or cream may be put into the tank F, and the valve $m^5$ be opened to let the same run into and through the pipes $m^3$ and into the pipe $m$, or the milk may be led in any way into the pipe $m$. The milk or cream in the pipe $m$ will enter the header $f^4$ and from it flow through the pipes $f^5$ into the header $f^3$, and then through pipe $f^6$ into header $f'$, pipes $f^2$, header $f$, and out therefrom through pipe $d^4$ into the amalgamator $c^{12}$ in communication with the bottom of the purifying cylinder or chamber. The milk-coolers, composed of the headers and pipes as stated, are located in the refrigerator tanks or chests G and G' respectively, packed with ice or salt, or with some other suitable material to bring the temperature of the milk to the degree required. The tank D having been supplied with water and the chemical substances dissolved therein for use in the wash-box, the valve $d'$ will be opened and the liquid contents of the tank will be fed into the wash-box to partially fill the same. By keeping the valves $d'$ and $d^2$ open a little, the constant flow of liquid into the wash-box may be determined. The air to be used will, by the action of the blower, be taken in through the filter, through the ice tank and in contact with the ice therein, and the floating particles of foreign material having been removed from the air, the blower will force the cooled and purified air through the liquid in the wash-box, thus further purifying the air, and, in case the water has been chemically treated, becoming more or less impregnated or saturated with the said chemicals. The air, after being washed, enters the air chamber at the top of the wash-box, and enters the open lower ends of the pipes $c^5$ and into the pipe $c^6$, thence by the pipe $c^7$ inclosed in the tank G in the refrigerating mixture, thence by pipes $c^7$, $c^9$ to the amalgamator $c^{12}$, by the pipe $c^8$ into the air chamber $c^{10}$, in which terminates the upper end of the hollow piston-rod C', having the hollow air-distributing dasher. In the manner described, a current of cooled milk or cream, and a current of washed and cooled air will meet and unite in the amalgamator $c^{12}$, together will be forced through the milk and air atomizers, and the milk, being finely divided or sprayed, will have air brought most thoroughly in contact with all its particles, and air will also be distributed through the milk or cream in the hollow movable dasher. The milk and air, forced through the atomizers under pressure, will be sprayed into the upper portion of the said cylinder and against preferably the return atomizer. This operation fully separates the globules of milk or cream and enables the purified air to come in direct contact with each and every particle of the said milk or cream. The unpleasant odors in the milk are absorbed or neutralized or washed out by the purified and prepared air, and the air, having done its work, is taken away through the outlet or discharge pipe $h^7$.

Among all the food products used by man none is more susceptible to take up impurities from the atmosphere or surrounding objects than milk, and air simply cooled and discharged into the milk takes thereinto the impurities of the air. This invention goes beyond the introduction of cooled air, and provides for washing the air and also cooling it by contact with ice, and thereafter impregnating the washed air with a purifying, deodorizing or disinfecting substance, by passing said air through a bath containing the substance used, as for instance, lime. By absolutely purifying and disinfecting the air forced into and distributed throughout the milk or cream in the vessel holding the same, so that all the particles thereof are subjected to the action of the air, such milk or cream is rendered much more wholesome and sweet than most commonly sold by milk dealers. Drawing air intermittingly, a little at a time, over ice, and then forcing the air against the top surface of the body of milk or cream in a vessel would not effect such a commingling thereof with the air as would carry away from such milk or cream the impure air and odoriferous bodies so frequently found therein.

During the operation of purifying the milk or cream, both or either, it is preferred to reciprocate the dasher in the milk. The valves or cocks 19 of the pipe 18 located at the milk level in the purifying cylinder, will be left open so that there will be a continuous discharge of purified milk or cream from the said cylinder, milk or cream coming into said cylinder continuously. If the milk is to be sterilized, the same course of treatment will be pursued, only the milk will be boiled by steam while in the tubes $m^3$ of the heater or boiler.

Herein I have used the terms "milk" and "cream." My invention is applicable for purifying either what is called "whole" milk, or cream which may be removed from whole milk by usual skimming operations or by centrifugal actions; and it may also be used to advantage with milk left after the removal of the cream by centrifugal action. In view of this fact, and to avoid alternative expressions in the claims to follow, I shall in the claims use the term "milk," and by that word I intend to include milk in any form, and cream in any form, whether together or separate.

In another application, Serial No. 416,300, filed by me on the 28th day of December, 1891, I have shown quite a number of the parts which are herein represented as adapted to cool and wash the air, and in the said application the said parts are claimed broadly, and also claimed in combination with a churn for the production of butter.

I might readily adapt the machine shown in this present application to butter-making by substituting for the purifying chamber and its contained parts, the churn and its contained parts as shown in said application, lengthening, however, the stroke of the piston-rod carrying the air-distributing dasher to give it a churning stroke, and cutting off or not using the milk supply-tank and cooling or refrigerating pipes.

The purifying cylinder may be of any suitable dimensions and of any suitable shape in cross section. Herein the milk and air are amalgamated and fed substantially continuously to the purifying cylinder through the air and milk atomizers, and the milk when in the cylinder, is further charged or washed with air supplied by the dasher, and the air having acted upon the milk and separated itself from the milk is conducted away through the impure-air outlet pipe, and the milk is led continuously away through the milk-discharge pipe, the feeding of milk into the cylinder and its discharge therefrom being substantially continuous, and while the milk is in the cylinder finely divided streams of air are forced through it from the dasher.

Owing to the continuous feed into and the discharge of the milk from the cylinder, the dasher does not agitate the milk or cream for a sufficient length of time to produce butter, but in my application, Serial No. 416,300, wherein the cream is put into a vessel or cylinder in a churn where it is retained, the dasher, being given a suitable stroke, makes butter.

The hollow piston-rod will preferably be made from two pieces of pipe, each screwed into a part or hub of the cross-head, so that the part of the piston-rod to which is connected the dasher, of whatever form, may be readily detached when the cylinder is to be removed.

I have herein represented the dasher as connected with a hollow piston, but I desire to have it understood that instead of the particular hollow dasher herein shown I may use a dasher shaped externally in any usual manner, providing the same, however, with means for receiving and discharging air into the milk or cream; and the said dasher may have movement imparted to it in the milk or cream in the vessel in any usual manner, and by any usual means.

I consider as within the scope of my invention the employment of any equivalent for the dasher, whereby the purified air may be distributed into and through the body of the milk or cream,—or, in other words, the dasher constitutes an air-distributing device.

To convert the apparatus so far described into a churn, the purifying cylinder E, shown in Fig. 1, may be removed as described and in its place be substituted the cylinder or vessel V, the same in construction as represented in my application, Serial No. 416,300, the said vessel having a hollow perforated bottom piece, shown in Fig. 11 in side elevation and in plan view in Fig. 13, the same being provided with a series of fine holes for the discharge into the cream in the said vessel, of purified cooled air, it receiving the air through a pipe $D^{4\times}$, $D^4$, as provided for in said application.

For the dasher shown in Fig. 1, I shall substitute the dasher $B^{12}$, shown in side elevation in Fig. 11 and in plan view in Fig. 12, it being connected with a hollow piston-rod $B^5$, the said dasher and piston-rod being common to the said application.

When the apparatus is to be used for a churn, the dasher $B^{12}$ will have a longer stroke than when the dasher is of the variety shown in Fig. 1. In both instances the dasher will in its movements distribute washed and cooled air into the contents of the vessel in which it is moved.

Having described my invention, what I claim, and desire to secure by Letters Patent, is—

1. In an apparatus for the continuous purification of milk, the following instrumentalities, viz:—a closed purifying chamber for the material to be purified; an inclosed milk and air amalgamator having a common outlet opening into said chamber; a milk-supply-pipe leading to said amalgamator; an air purifying chamber containing a filter and a wash box; a blower communicating with the air purifying chamber, and a pipe connecting said chamber and amalgamator to supply washed and filtered air to the amalgamator and material supplied thereto, substantially as described.

2. A purifying chamber for the milk: an ice receiving tank, having a return air chamber therein: a blower intermediate said purifying and return air chambers: and pipes connecting the blower with the chambers, whereby a current of air is established through the ice tank and in contact with the ice, and a milk supply-pipe opening into the air conducting pipe adjacent to the milk purifying chamber, substantially as described.

3. A purifying cylinder, a series of milk and air atomizers therein, combined with a return atomizer located above said series, and means to force previously intermingled milk and air through said atomizers into the purifying cylinder and against the return atomizer, and also to force an independent current of air into and through said chamber and the liquid therein, substantially as described.

4. A purifying cylinder: an air distributing dasher: a reciprocating hollow-piston-rod connected to the dasher: and a milk supply pipe opening into said cylinder below the dasher: combined with a blower to force air through said piston-rod into the dasher, and also into the milk-supply pipe and means to reciprocate said piston-rod, substantially as described.

5. The purifying cylinder: a series of milk and air atomizers therein: an air distributing perforated dasher: guide openings therein through which the said atomizers are extended: a reciprocating hollow piston-rod to which the dasher is attached: and a blower: combined with connecting pipes to force air continuously into the dasher: and into the atomizers and means to reciprocate the piston-rod, the atomizers acting as guides for the dasher, substantially as described.

6. The method of sterilizing and purifying milk, which consists in boiling the milk: cooling the same thereafter: commingling the sterilized and cooled milk under pressure with a current of previously and separately cooled and purified air, and thereafter agitating and separating the milk and air, the separated air thereby taking up and retaining all impurities in the milk, substantially as described.

In testimony whereof I have signed my name to this specification in the presence of two subscribing witnesses.

GEORGE W. GRADER.

Witnesses:
GEO. W. GREGORY,
GEORGE F. RANDLETT.